United States Patent [19]

Hill

[11] 4,274,397
[45] Jun. 23, 1981

[54] SOLAR HEATER

[76] Inventor: Clifford W. Hill, 844 S. Thunderbird Rd., Florence, S.C. 29501

[21] Appl. No.: 887,216

[22] Filed: Mar. 16, 1978

[51] Int. Cl.³ .................................................. F24J 3/02
[52] U.S. Cl. .................................................... 126/451
[58] Field of Search ........................ 126/438, 439, 451

[56] References Cited

U.S. PATENT DOCUMENTS

| | | | |
|---|---|---|---|
| 2,909,171 | 10/1959 | Lof | 126/451 |
| 3,974,824 | 8/1976 | Smith | 126/438 |
| 3,986,490 | 10/1976 | Chao et al. | 126/438 |
| 4,003,366 | 1/1977 | Lightfoot | 126/438 |

FOREIGN PATENT DOCUMENTS 2614545  4/1976  Fed. Rep. of Germany ........... 126/438

Primary Examiner—Carroll B. Dority, Jr.
Attorney, Agent, or Firm—Clifton T. Hunt, Jr.

[57] ABSTRACT

The invention is a solar heater which may function as a humidifier and which has a reflector that is constructed to provide a window, and external thermal insulation. The window has a cover that is positioned to transmit solar radiation to the reflector. The top portion of the reflector has an opening, and a container is removably positioned in the opening. The reflector has a geometry that reflects a high percentage of solar energy to the container, which has a surface with high absorptance. The container has a removable lid for confining heat within the container for certain functions, such as boiling water or drying clothes. When used as a humidifier, the container is filled with water and the lid is removed.

2 Claims, 10 Drawing Figures

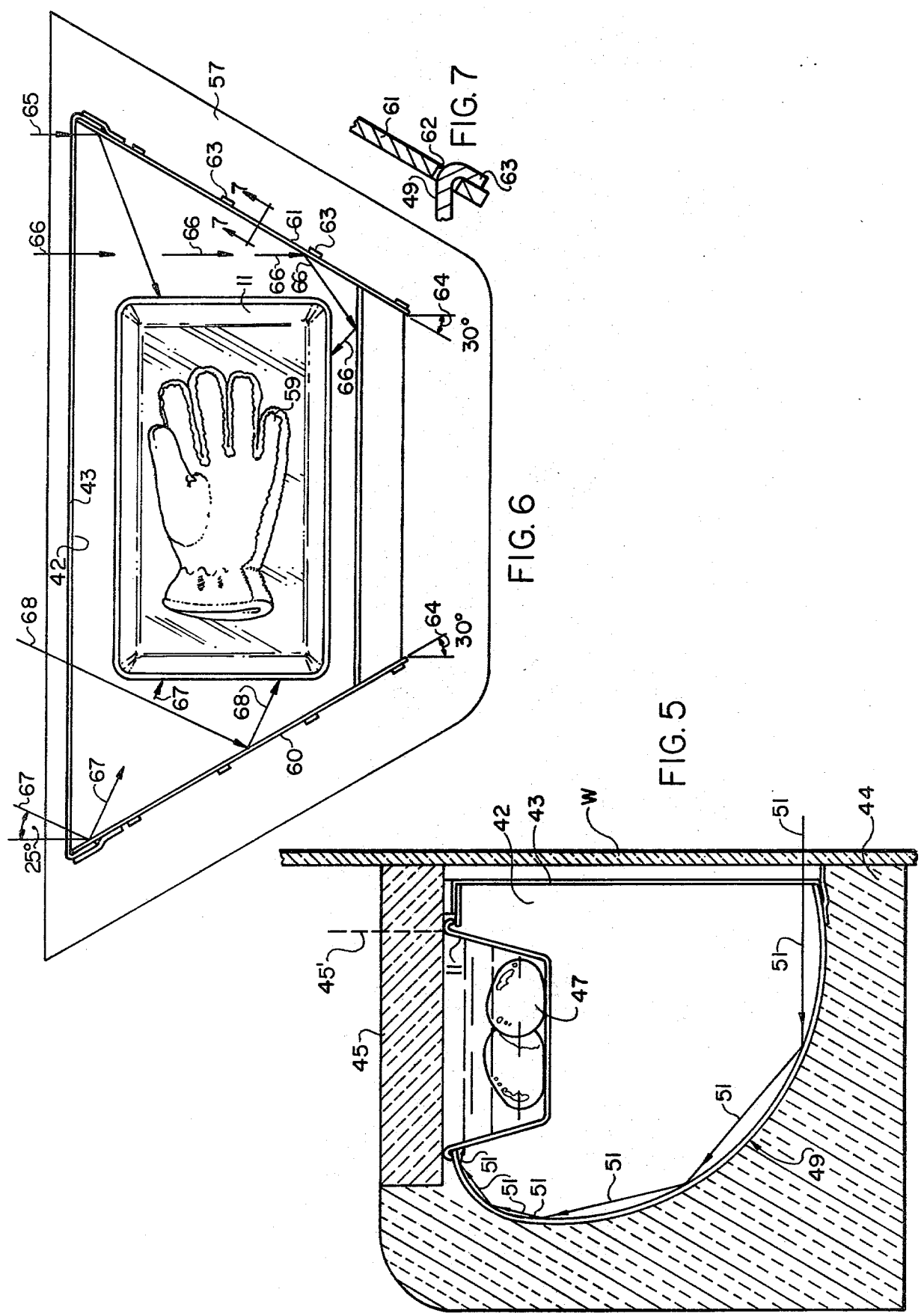

4,274,397

SOLAR HEATER

BACKGROUND OF THE INVENTION

This invention relates to a solar heater that will heat water, food, etc. and dry clothes. Prior to the present invention, an economical and practical solar device to provide these functions has not existed.

SUMMARY OF THE INVENTION

This invention relates to a solar heater that utilizes solar energy coming through a building window or outdoor solar energy. The solar heater has a reflector that is constructed to provide a window, and external thermal insulation. The window has a cover that is positioned to transmit solar radiation to the reflector. The top portion of the reflector has an opening, and a container is removably positioned in the opening. Optimum radii and angles for the reflector has been determined to reflect maximum solar energy to the container, which has an external surface with high absorptance. When used as a humidifier, the container is filled with water and its lid is removed.

An object of the invention is to heat water for making hot beverages, for washing, etc., and for humidification. Another object is to heat and warm foods. Another object is to dry and warm clothes. Other objects are to minimize energy and apparatus costs. Another object is to provide a means of heating water, food, etc. when electricity and other energy sources are not available.

BRIEF DESCRIPTION OF THE DRAWINGS

FIG. 5 is a vertical sectional view taken substantially along the line 5—5 in FIG. 2A with a household window added to show a preferred relationship of the household window with the window cover of the solar heater, and showing two eggs being cooked;

FIG. 6 is a horizontal sectional view taken substantially along the line 6—6 in FIG. 2A and showing a glove being dried;

FIG. 7 is an enlarged vertical sectional view, with parts broken away, taken substantially along the line 7—7 in FIG. 6;

DETAILED DESCRIPTION OF THE INVENTION

Figure 1:
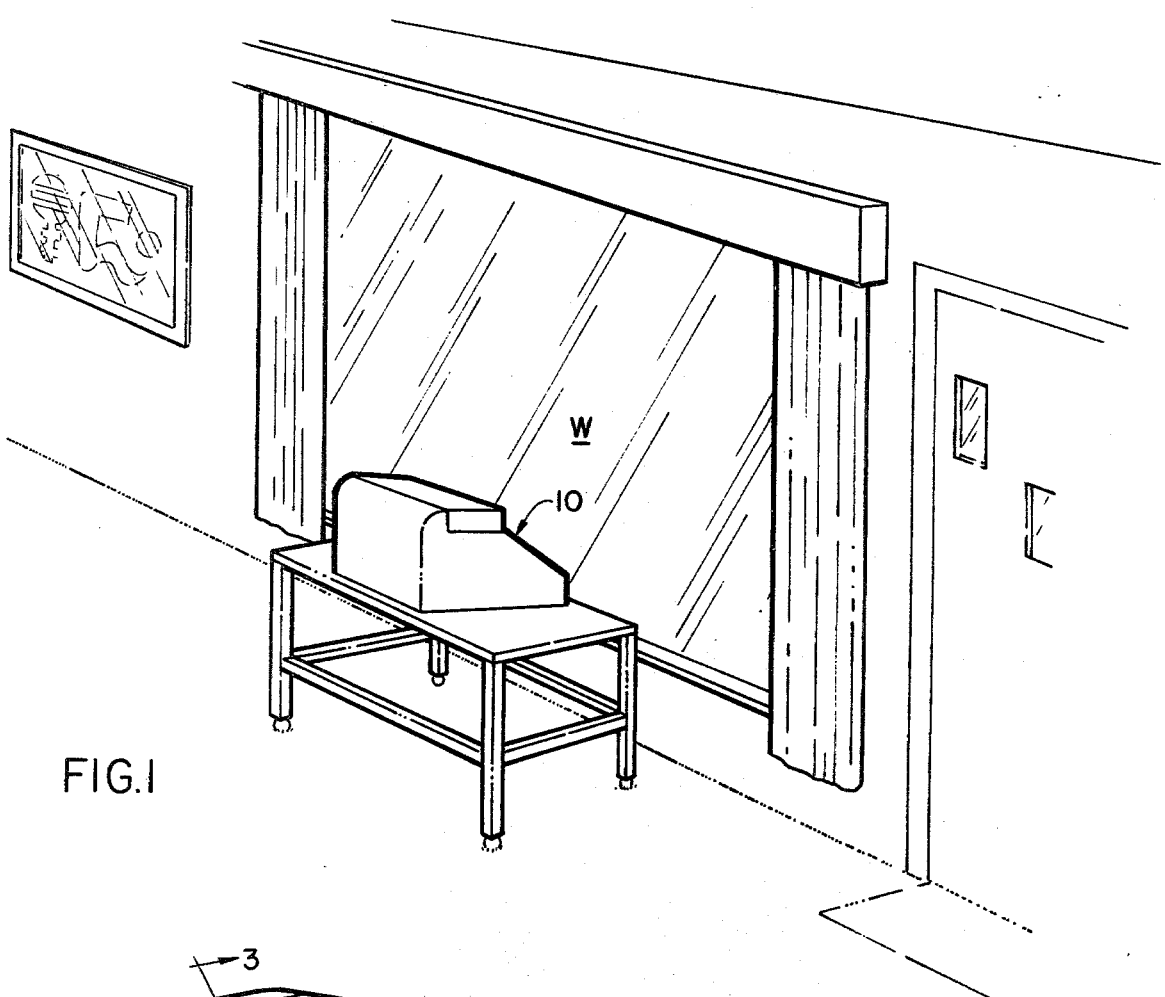
FIG. 1 is a perspective view looking at the back and one side of the solar heater positioned to receive solar radiation through a house window.

Referring more specifically to the drawings, the solar heater is broadly indicated at 10, and includes a reflector broadly indicated at 12 that is constructed to provide an opening or window 13 that has a cover 16 positioned to transmit solar radiation to the reflector 12. The solar radiation may be coming through a building window W, or it may be outdoor solar radiation. The reflector has a top wall 12A with an opening 16 and a container 11 is positioned in the opening 16 with a lip 14 of the container resting on the upper surface of the top wall 12A of the reflector 12.

According to the Pacific Regional Solar Heating Handbook, 2d Edition, prepared for ERDA, San Francisco Operations Office by Los Alamos Scientific Laboratory, Solar Energy Group, University of California, Los Alamos, N.M. 87545, the occurrence of solar altitude angles above 75° in the United States is a very small portion of the total. Roof overhangs frequently shade the sun at solar altitude angles above 75°. Due to the interference of trees, buildings, etc., and due to the reduced intensity of solar energy at low solar altitude angles, the usefulness of solar altitude angles below 15° is very limited. Therefore, for purposes of this invention, only angles of the sun from 15° to 75° above the horizon will be considered.

Figure 3:
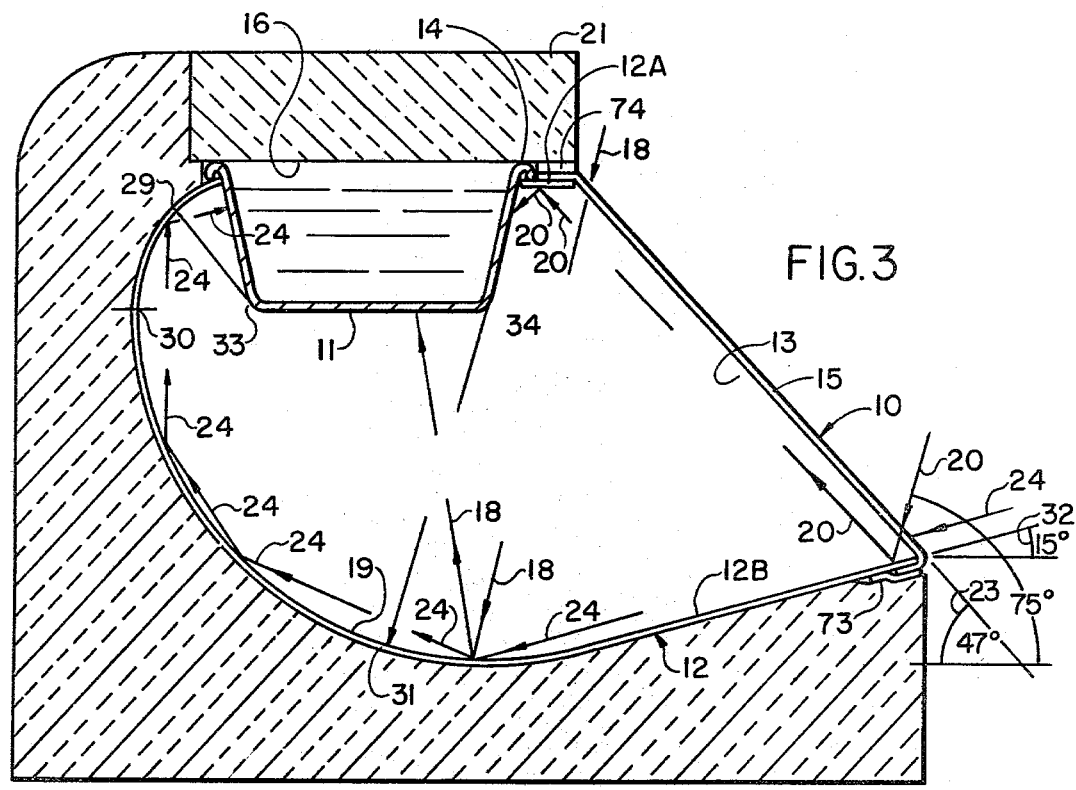
FIG. 3 is a vertical sectional view taken substantially along the line 3—3 in FIG. 2.

Based partly upon the collector tilt data described in the Pacific Regional Solar Heating Handbook, and considering the latitudes of the geographic and population centers of the United States, a desirable tilt angle above the horizontal for the window 13 and window cover 15 is approximately 47°, which is indicated at 23 in FIG. 3.

A solar energy ray having a solar altitude angle of 75° and indicated at 18 in FIG. 3, through the top of window cover 15, impinges on the reflector 12, and is reflected to the bottom surface of container 11, which has high absorptance. Solar energy ray 20, which has a solar altitude angle of 75°, is transmitted through the bottom of window cover 15, impinges on the reflector 12, and is reflected to the top wall 12A of reflector 12 from where it is reflected to the front container 11, which has high absorptance. Similarly, all frontal solar energy rays having 75° angularity between solar energy ray 18 and solar energy ray 20 are reflected from reflector 12 to container 11 where a high percentage of the solar energy is absorbed by the container 11 and the energy is transferred to the water or other material that is in the container.

Still referring to FIG. 3, a solar energy ray 24 having a solar altitude angle of 15° passes through the bottom of window cover 15, impinges on the reflector 12, and is re-reflected along the curved inner surface 19 of reflector 12 to the back surface of container 11, which has high absorptance. Similarly, all solar energy rays having solar altitude angles of 15° through 75° are reflected to the container 11 from reflector 12.

This efficient shape of the reflector 12 for reflecting the solar energy rays to the container 10 is accomplished primarily by radii 29 and 31 and by angle 32. Back corner radius 29 preferably has a center 33 approximately at the bottom back corner of container 11. Radius 29 is approximately equal to the distance from the center 33 to the bottom of lip 14. The front corner radius 31 preferably has a center 34 approximately at the bottom front corner of container 11. Front corner radius 31 is preferably determined by center 34 and the tangent point 30, which is level with the bottom of container 10 and determined by back corner radius 29.

Under near optimum conditions, water in container 11 will boil. When used as a humidifier with thermally insulated lid 21 removed, under near optimum conditions the water level in container 11 will be reduced up to approximately 4 millimeters per hour by vaporization of the water.

If the center 34 of radius 31 is below or to the right of the preferred location as illustrated in FIG. 3, solar energy rays coming between that new center and the preferred center 34 will be reflected away from container 11 and lost. If the center of radius 29 is below or to the left of the preferred location as illustrated in FIG. 1, solar energy rays coming between the new center and the preferred center 33 will be reflected away from container 11 and lost. If the centers of radii 29 and 31 are moved into the area of container 11, the size of the reflector and window will be reduced, thus reducing the heat input and reducing temperatures of the container. If radii 29 and 31 are reduced, the window area and heat input are decreased, thus decreasing temperatures of container 11. If radii 29 and 31 are increased, some solar energy rays would be lost.

The preferred angularity of bottom reflector 12B is 15°, which angularity is indicated at 32 in FIG. 3. All frontal solar energy rays with solar altitudes from 15° to 75° that impinge on the 15° bottom reflector 12B are reflected to container 11. Bottom reflector angles above 20° and below 10° result in some loss of solar energy rays in the solar heater of FIG. 2.

Figure 2:
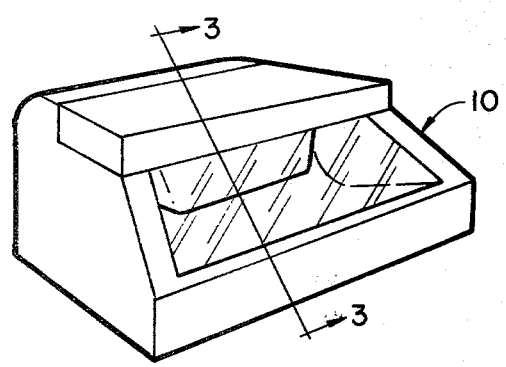
FIG. 2 is a perspective view of the front and one side of the solar heater shown in FIG. 1.

There can be significant changes in the reflector 12 of the preferred configuration of FIG. 2 without resulting in great reduction in ability to heat container 10. The preferred configuration of the reflector 12 is illustrated in FIG. 3 and substantially duplicated in FIG. 4 by a series of angled surfaces indicated by dashed lines 35 that approach configuration 12 and have only slightly less efficiency than configuration 12. Configuration 36 (FIG. 4) is based on the front corner radius 31 being reduced by half. This results in approximately 40% reduction in heat input, but this is adequate for significant use of the device. Configuration 37 is based on the front corner radius 31 being doubled. This results in some loss of solar energy rays, particularly those that are reflected from surface 38. Configuration 39, which approaches configuration 37, is constructed of a series of angled surfaces. The angled surfaces 40 and 41, at the top end of configuration 39, more closely approach the FIG. 3 shape and thereby minimize the loss of solar energy rays. The most useful range of configurations for reflector 12 are those bounded by the front corner radius having a range of half to double the FIG. 3 configuration, preferably but not exclusively, in combination with the 15° bottom reflector angle.

Figure 4:
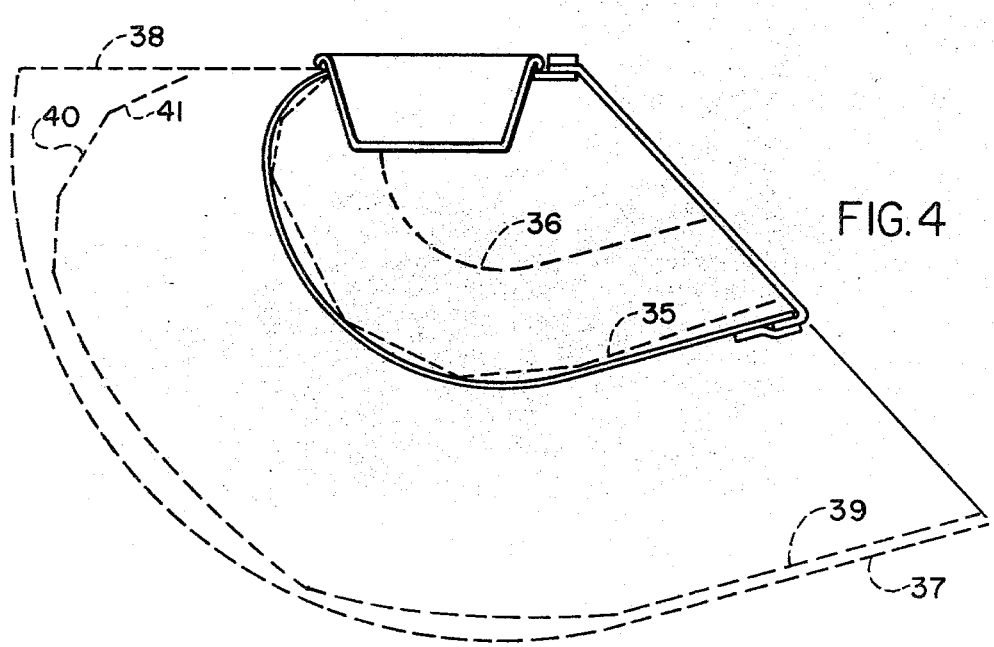
FIG. 4 is a vertical sectional view similar to FIG. 3 but omitting the insulation and illustrating alternative reflector configurations.

The thermal insulation can be omitted as suggested in FIG. 4 if only modest increase in temperature of the container is required.

Figure 2A:
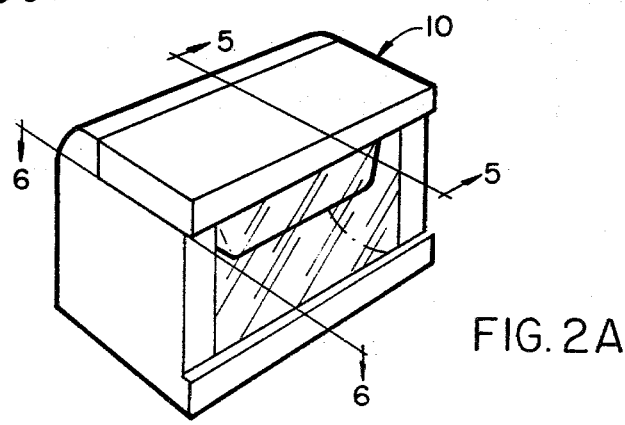
FIG. 2A is a view similar to FIG. 2, but illustrating a modified form of the invention.

The tilt angle of window 42 and window cover 43 in the solar heater of FIGS. 2A and 5 is 90°. The thermal insulation 44 and thermally insulating container lid 45 may extend approximately ¼ to 1 inch (0.635 centimeters to 2.5 centimeters) beyond the window cover 43. Similarly, as indicated by the top view, FIG. 6, the thermal insulation 57 and 58 may extend approximately ¼ inch to 1 inch beyond the window cover 43. This permits these thermally insulating surfaces to be positioned against the building window W, as illustrated in FIG. 5, which results in reduced heat losses through the window cover 43. The solar heater of FIG. 5 also has the advantage that it does not extend as far from the building window W as the solar heater of FIGS. 2 and 3, thus taking up less space.

Food 47 is shown in container 11 of FIG. 5 to illustrate that the solar heater may be used to heat, warm, defrost, and, in some cases, to cook food. When used as a humidifier, the container is filled with water, and the lid 45 is preferably placed in a vertical position 45' against the window as illustrated by the dotted lines. The lid in the vertical position 45' prevents condensation on the window.

Other things being equal, the 90° tilt angle in FIG. 5 is not as effective for increasing temperatures of container 11 as the 47° tilt angle of FIGS. 2 and 3. However, in addition to the advantages previously listed the embodiment of FIG. 5 will reflect solar energy rays with a somewhat broader range of solar altitude angles to the container 11. Reflector 49 in FIG. 5 is similar to reflector 12 in FIGS. 2 and 3, except the angularly extending bottom reflector wall is eliminated. Consequently a horizontally extending solar energy ray 51 impinges on reflector 49 (FIG. 5) and is re-reflected to the back of container 11.

An article of clothing is shown in container 11 in FIG. 6 to illustrate that the solar heater 10 may also be used for drying and warming clothes. FIG. 5 also illustrates a reflector that includes side reflectors 60 and 61 in addition to curved reflector 49. The side reflectors 60 and 61 are preferably attached to the curved reflector 49 by means of tabs and slots. The tabs 63 are preferably small extensions of the curved reflector 49 that are inserted into slots 62 in the side reflectors and then bent as illustrated in FIG. 7. Preferably the tabs and slots are spaced every few inches at the juncture of the side reflectors 60 and 61. Alternatively, the tabs may be in the side reflectors and the slots in the curved reflector.

The preferred angularity of side reflectors 60 and 61 is 30° as indicated at 64 in FIG. 6. As illustrated, frontal solar energy rays 65 and 66 are reflected to container 11, and solar energy rays 67 and 68, which are 25° from the frontal position, are reflected to container 11.

If the side reflector angle 64 is increased to 45°, the frontal and a portion of the 25° from frontal solar energy rays would be lost from positions 65 and 67. If the side reflector angle 64 is decreased to 15°, a portion of the container would be shaded if the solar energy rays were directed at 25° from the frontal position. Also, with the side reflector angle decreased to 15°, there would be a reduction in the area of window 42 and a resulting reduction in heat input. Thus, a preferred tolerance for the side reflector angle 64 is plus or minus 15° from the preferred 30° side reflector angle.

Figure 8:
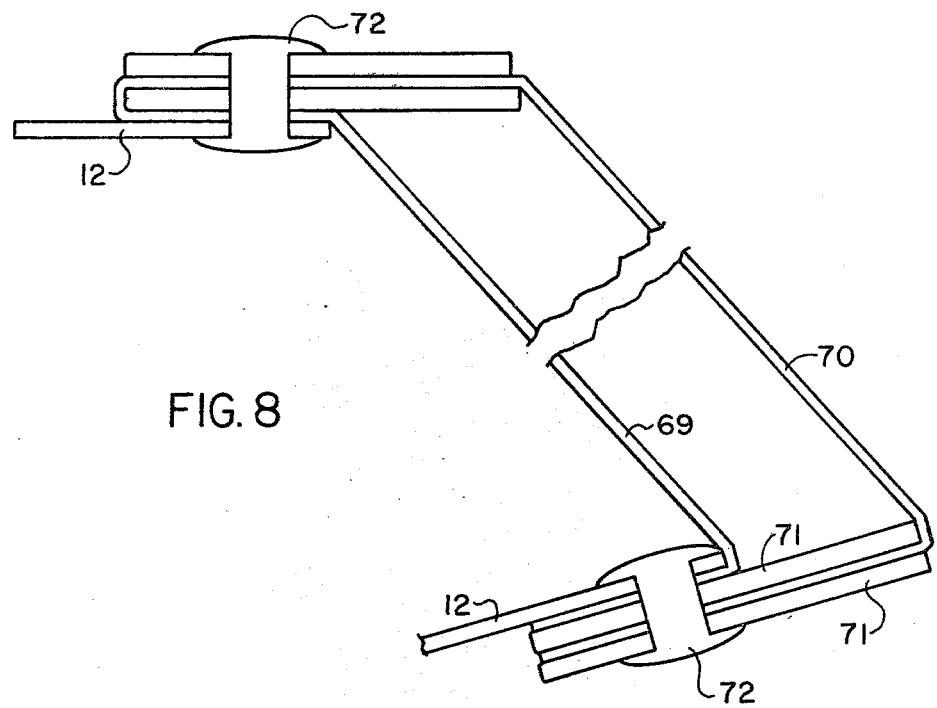
FIG. 8 is a sectional view similar to the right side of FIG. 3 but showing an alternative construction wherein two layers of the window cover are utilized.

FIG. 8 illustrates an alternative in which there are two window covers 69 and 70 that are preferably positioned approximately ¼ to 1 inch (0.635 to 2.5 centimeters) apart. The two window covers decrease heat losses. The preferred material for the window covers is 0.004 inch (0.01016 centimeters) thick polyvinyl fluoride film, which is recommended in NASA Technical Memorandum TM X-3294 entitled "An Inexpensive Economical Solar Heating System for Homes" published by National Aeronautics and Space Administration, Washington, D.C. Preferably the window covers 69 and 70 are mounted on reflector 12 by means of clear polycarbonate mounting strips 71 and aluminum rivets 72 or by screws. The clean polycarbonate transmits solar radiation and has adequate strength and heat resistance. The window cover 15 in FIG. 3 preferably is mounted on the reflector 12 by polyester adhesive tape 13 at the bottom and sides and by polycarbonate spacer 74 at the top with epoxy adhesive, rivets, or screws.

Figure 9:
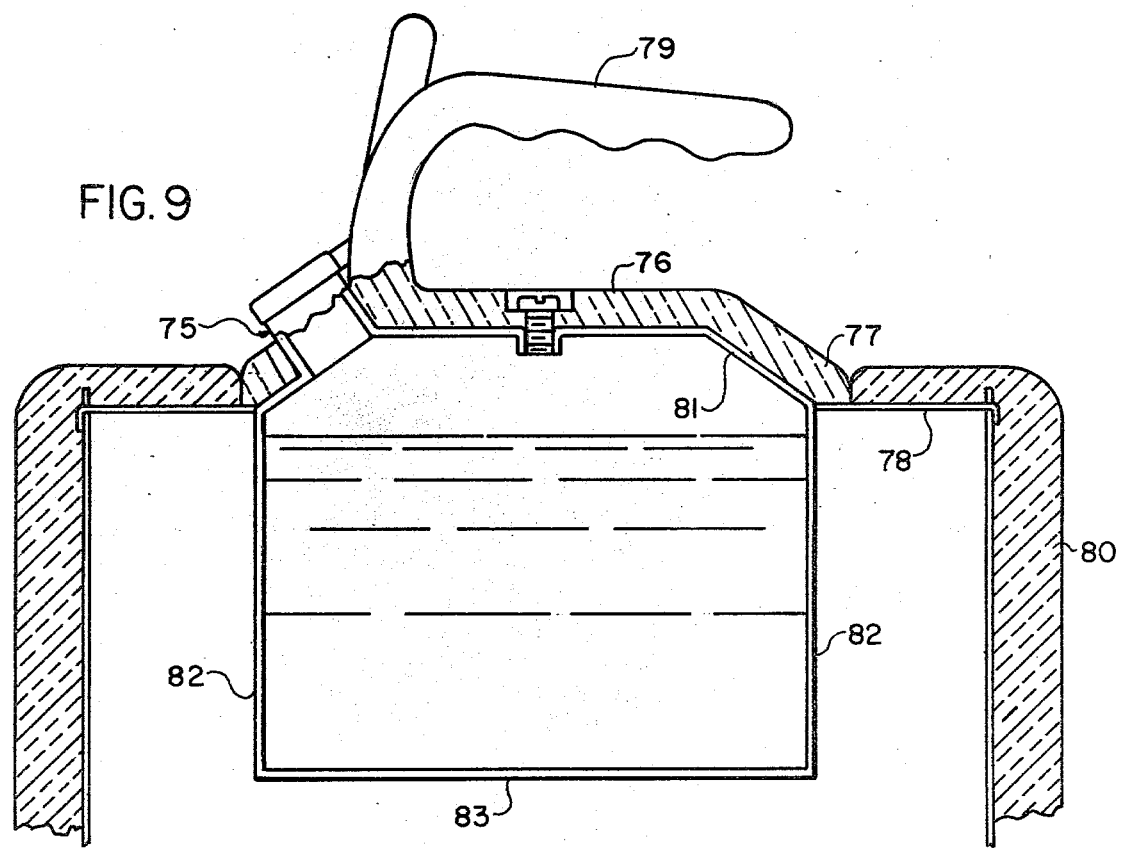
FIG. 9 is a vertical sectional view, with parts broken away, of an assembly wherein the container is in the form of a teakettle.

FIG. 9 illustrates a container 75 that is in the form of a teakettle. Container 75 may be substituted for container 11 and container lid 21 as a means of more conveniently transporting heated liquids. Preferably the teakettle would have thermal insulation 76 at the top and a lip 77 that would provide support for the teakettle on the top portion of the reflector 78. The lip 77 may be formed as part of the insulation 76, as illustrated, or it may be formed as part of the metallic portion 81 of the teakettle. The insulation 76 may be formed as an integral part of handle 79 as illustrated, or the insulation may be separately formed. If the insulation 76 is separately formed, it preferably is made of rigid urethane foam. If the handle 79, insulation 76 and lip 77 are formed as one part, it preferably is made of phenolic. The insulation 80 is preferably made of rigid urethane foam. The metal portion 81 of the container is preferably made of copper or aluminum.

The external sides 82 and bottom 83 of the teakettle 75 and the external sides and bottom of the container 11 in FIGS. 1–6 are preferably coated with flat black alkyd paint or other material that will provide high absorptance. The container 11 is preferably made of aluminum or copper.

The thermal insulation 44 is preferably formed of rigid urethane foam, which has low thermal conductivity and sufficient strength to provide the supporting structure and base for the other parts of the solar heater as illustrated in FIGS. 1–3, 5 and 6. Insulation thicknesses of 1 to 3 inches (2.54 to 7.62 centimeters) are generally preferred. The container lid is preferably made of rigid urethane foam so that it will provide both lid and thermal insulation functions. The lid may also be made of metal, preferably aluminum, or various plastics, preferably nylon, with a covering of efficient thermal insulation, preferably rigid foam urethane.

The reflectors in all embodiments are preferably made of aluminum alloy number 1100 or other material with high reflectivity.

In the drawings and specification there has been set forth a preferred embodiment of the invention and although specific terms are employed, they are used in a generic and descriptive sense only and not for purposes of limitation, the scope of the invention being defined in the claims.

I claim:
1. A solar heater for humidification and cooking within a building comprising
    (a) a curvalinear non-parabolic reflector defining the rear wall of the solar heater and having top and bottom edges defining corresponding edges of a front window therebetween, side walls extending between the top and bottom walls to define the side edges of the window and said window facing toward a source of light.
    (b) a transparent cover enclosing the window,
    (c) a container having an absorptive surface,
    (d) means removably supporting the container within the reflective radius of the reflector,
    (e) thermal insulation extending about the reflector and walls,
    (f) said curvalinear reflector including a curvature through a minor radius and a major radius about the bottom and rear walls of said container, the minor radius of the reflector being centered at the bottom rear corner of the container and extending rearwardly and upwardly therefrom a distance equal to the height of the container and the major radius of the reflector being centered at the bottom front corner of the container and extending rearwardly therefrom at least half the distance to the tangent of the minor radius and downwardly and forwardly therefrom beneath the container, and
    (g) said reflector including a forward extension extending from the lower edge of the reflector at an angle of approximately fifteen degrees to the horizontal.

2. A structure according to claim 1 wherein the window of the solar heater is positioned adjacent a building window with the thermal insulation at the sides, bottom and top extending beyond the heater window and against the building window, and wherein a thermally insulated cover is provided for the container which is selectively movable into right angular relation to the container and against the building window.

* * * * *